United States Patent [19]
Stekelenburg

[11] Patent Number: 5,414,608
[45] Date of Patent: May 9, 1995

[54] REPLACEABLE STEM STRUCTURE FOR LAMP HOLDER

[75] Inventor: Albert Stekelenburg, Taipei, Taiwan, Prov. of China

[73] Assignee: All Line Inc., Taipei, Taiwan, Prov. of China

[21] Appl. No.: 160,080

[22] Filed: Nov. 30, 1993

[51] Int. Cl.$^6$ .............................................. F21V 21/08
[52] U.S. Cl. .................................... 362/396; 362/431
[58] Field of Search ............... 362/396, 431, 388, 418, 362/419, 413

[56] References Cited

U.S. PATENT DOCUMENTS

| | | | |
|---|---|---|---|
| 3,543,017 | 11/1970 | Mihailoff | 362/396 |
| 3,917,631 | 7/1975 | Jensen | 362/431 |
| 4,661,895 | 4/1987 | Hull | 362/396 |
| 4,827,389 | 5/1989 | Crum | 362/388 |
| 5,205,645 | 4/1993 | Lee | 362/431 |
| 5,249,112 | 9/1993 | Bray | 362/431 |
| 5,276,596 | 1/1994 | Krenzel | 362/396 |
| 5,307,255 | 4/1994 | Chen | 362/431 |
| 5,337,993 | 8/1994 | Hersman | 362/431 |

*Primary Examiner*—Richard R. Cole
*Attorney, Agent, or Firm*—W. Wayne Liauh

[57] ABSTRACT

The present invention relates to a replaceable lamp stem structure for lamp holder, comprising a hard lamp stem mounted under lamp head, a projecting post mounted under said lamp stem, said projecting post available in connection with various kinds of base (clamp holder or stick, etc.) with round hole or concave hole so as to provide suitable fixing structure for mounting position in facility of lighting use.

2 Claims, 4 Drawing Sheets

REPLACEABLE STEM STRUCTURE FOR LAMP HOLDER

BACKGROUND OF THE INVENTION

To meet the requirement of various different occasions, environments and demands, except for fixed type installation, it is essential to which outdoor lighting fixture shall be made available for portable and installation (fixed) at any place as desired.

Most of conventional portable type outdoor lamps are of clamp type, i.e. their structure comprises lamp head, lamp stem, clam holder or hanger for fixed with clamp holder or hanging up with hanger.

As there are wide variety of bulbs available for use, such as white bulb or halogen lamp; in addition, power specification includes AC, DC or car power supply. In short, outdoor lamps are extended to a wider variety of occasions.

If a conventional lamp holder is intended for the use in garden, camping, roadside or car repair, etc., it is often regretted for failure of use due to the problem of fixing position or angle.

SUMMARY OF THE INVENTION

Therefore one object of the present invention is to provide a lamp holder structure that is flexible for installation (fixing) subject to different requirement of occasion.

The present invention relates to a design of separable structure between lamp stem and clamp holder wherein the bottom part of said structure can be connected with other fixing device to form a suitable lamp holder for the environment concerned; for instance, the bottom part of said structure may connect with a stick to make it become lighting fixture that can be fixed on soil ground to attain much flexible use outdoor.

Another object of the present invention is to provide a lamp structure that allows for choice of projecting direction in order to achieve appropriate direction and angle of lighting.

BRIEF DESCRIPTION OF THE INVENTION

DETAILED DESCRIPTION OF THE INVENTION

Figure 1:
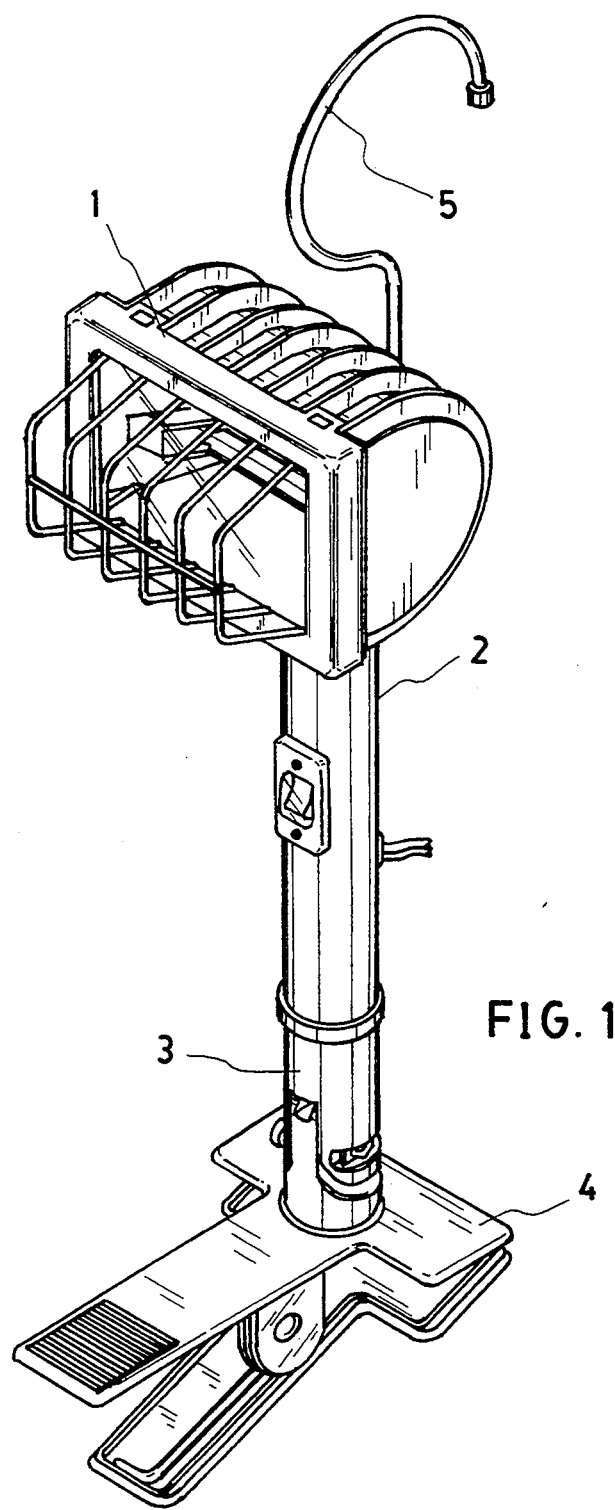
FIG. 1 is a perspective profile of the present invention.
Figure 2:
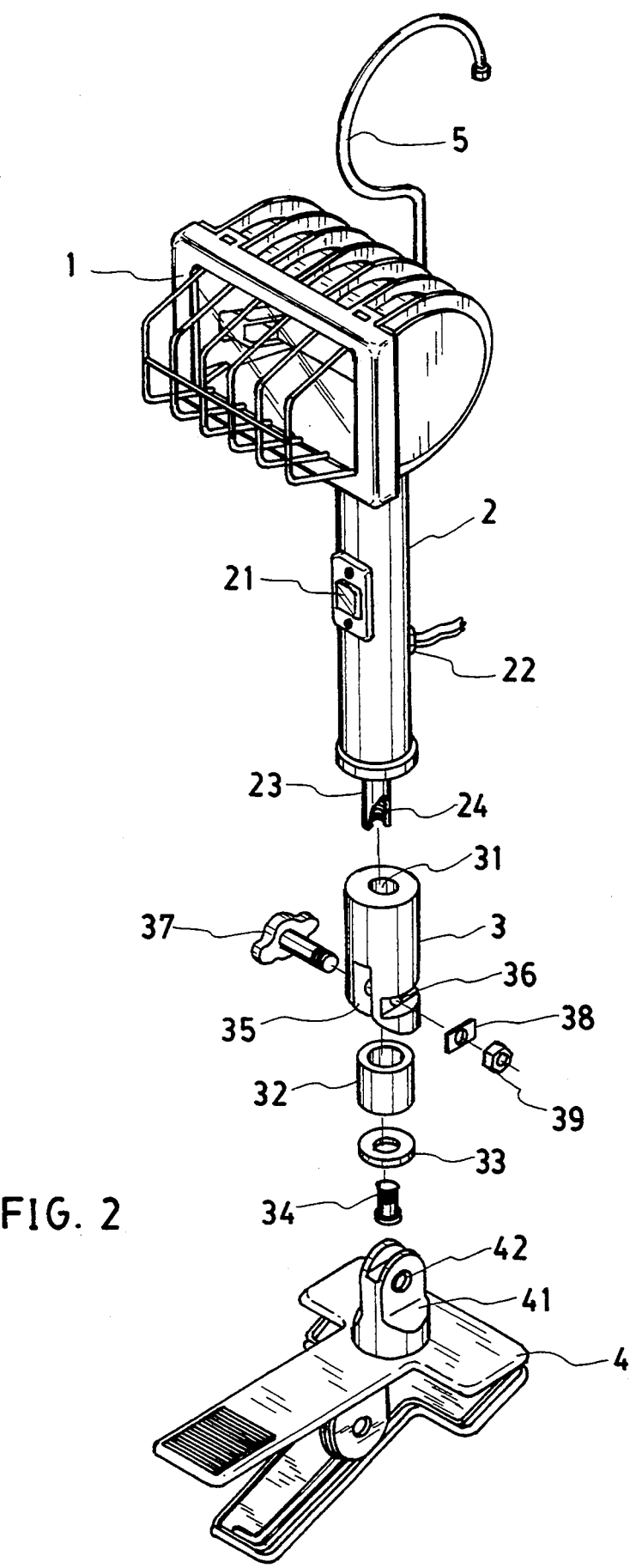
FIG. 2 is a perspective-exploded view of the present invention.

Referring to FIGS. 1 and 2, the present lamp holder comprises lamp head 1, lamp stem 2, connection body 3, clamp holder 4 and hanger 5.

The lamp head 1 shown may be halogen lamp head or other type of lamp such as white bulb, for giving a source of lighting.

The lamp stem 2 is hard stem body on which having switch 21 and outlet head 22 for leading power supply and switching lamp ON/OFF. In the center below the lamp stem 2 has projecting post 23 for receiving a thread hole 24 therein and such projecting post 23 is provided for connection with various kinds of fixing holders.

The connection body 3 is cut with round hole 31 in the top center. The connection body 3 further includes interior structure extending upwardly in connection with the projecting post 23 and a structure in connection with the clamp holder 4; said structure in connection with the projecting post 23 comprises a hollow post-type plastic tube 32, washer 33 and screw 34, when projecting post 23 is inserted in the thread hole of projecting post 23, plastic tube 32 and washer 33 shall be put on projecting post 23 and locked within the thread hole of projecting post 23 by means of screw 34, whereby lamp stem 2 and connection body 3 both form a rotary state, i.e. lamp head 1 can be selected for the direction of lighting through rotating lamp stem 2; the part in connection with the clamp holder 4 includes a notch 35 cut in the center below the connection body 3 and on each side wall of notch 35 has a hole 36 with hand screw 37, washer 38 and screw 39 for connection with projecting body 41 of clamp holder 4, whereby lamp head 1 can be changed in angle of elevation by means of notch 35 swinging forward and backward.

Except with clamping structure, clamp holder 4 further includes a projecting body 41 and the top of projecting body is hence shaped to fit the notch 35 under the connection body 3. And the projecting body is laterally made a hole 42 for the hand screw 37 passing through to lock up washer 38 an nut 39 thereof, whereby the lamp stem 2 after connected with the clamp holder 4 becomes adjustable for angle of elevation along the hole 42 as axle center.

Figure 3:
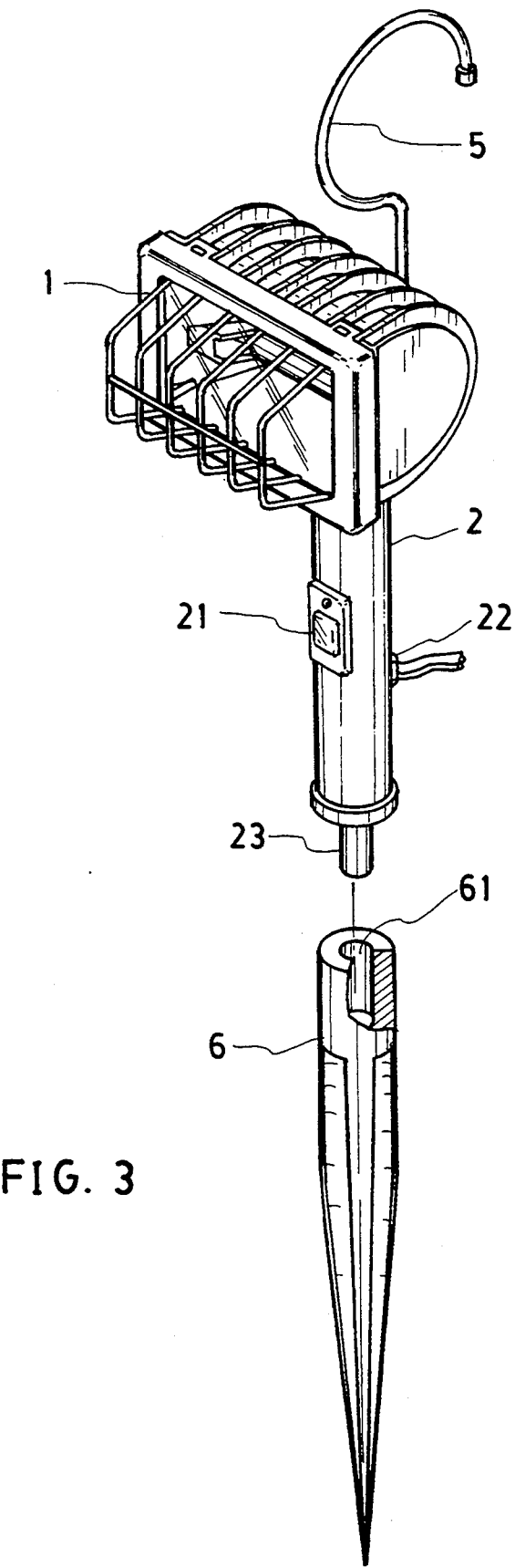
FIG. 3 is another prespective-exploded view of the present invention.
Figure 4:
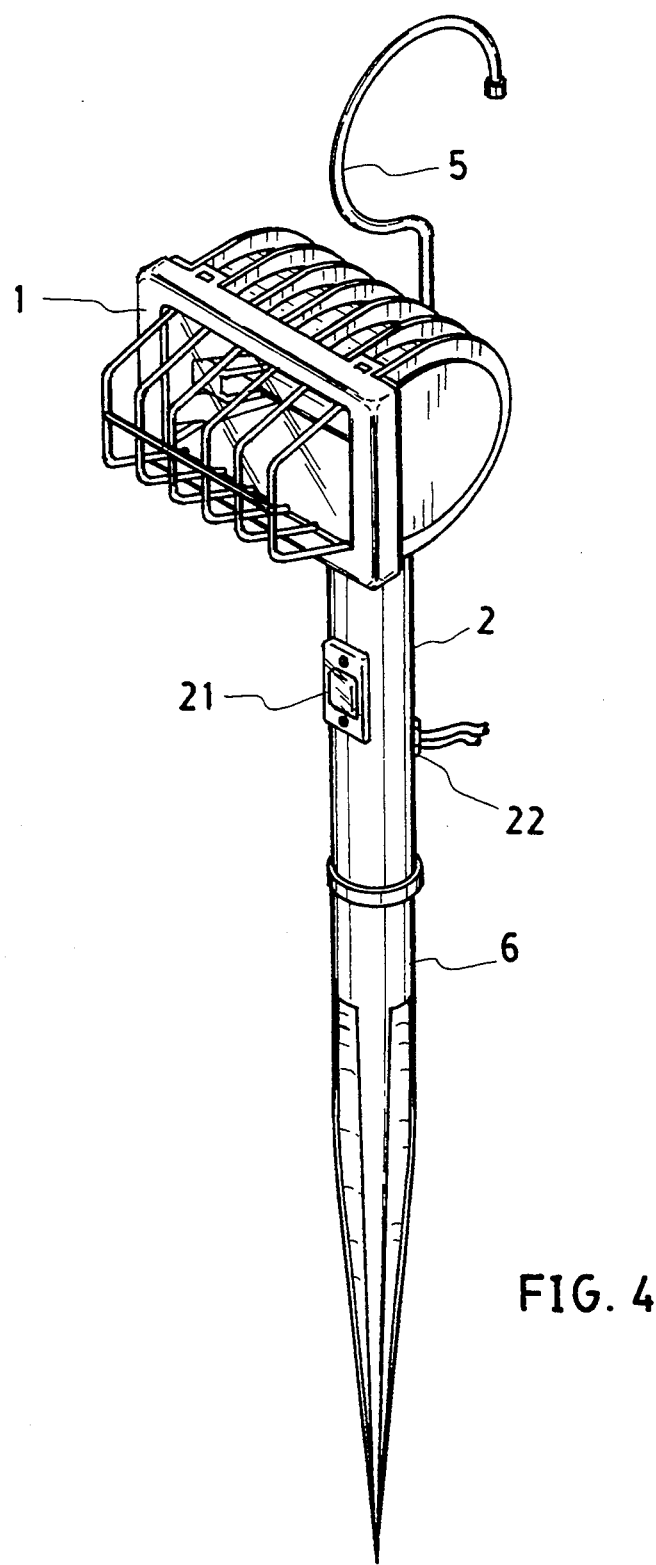
FIG. 4 is another perspective profile of the present invention.

Referring to FIGS. 3 and 4, the lamp stem 2 is mounted on a stick 6 after connection body 3 and clamp holder 4 are removed.

Said stick 6 relates to a stem body that can be sticked in the soil ground and the top of said stick 6 has a concave hole 61 with proper inside diameter for the projecting post 23 inserting therein so as to allow lamp stem 2 for 3600 free turning around the stick 6 in order to select the direction of lighting by lamp head 1.

To conclude above statement, the present invention relates to a hard lamp stem 2 and projecting post 23 mounted below the lamp stem 2, said projecting post 23 may be in connection with round hole 31 or concave hole 61 on various kinds of fixing structures to form a rotary assembly which can be matched with appropriate base (i.e. fixing structure) subject to the need of environment, for giving function of lighting.

What is claimed is:

1. A lamp structure with a replaceable mounting base comprising:
   (a) a lamp head;
   (b) a lamp stem having first and second lamp stem ends, wherein said lamp stem being connected to said lamp head at said first lamp stem end, and said lamp stem having an internally threaded post at said second lamp stem end;
   (c) a replaceable mounting base having first and second mounting base ends, wherein said first mounting base end containing a hollow cylindrical hole for receiving said internally threaded post of said lamp stem so as to support said lamp stem while allowing said lamp head to do 360° rotation;
   (d) a connecting body containing said first and second mounting base ends and said hollow cylindrical hole for receiving said internally threaded post;
   (e) a clamp holder having a projecting body, said projecting body containing a projecting hole therethrough;

(f) a lamp stem screw to be threadably received by said internally threaded cylindrical post so as to fixedly but rotatably affix said lamp stem to said connecting body;

(g) said connecting body further containing an axially extending hollow portion and a radially extending hand screw hole in said second mounting base end, said axially extending hollow portion being so dimensioned for completely receiving said lamp stem screw; and (h) a hand screw means to be inserted through said projecting hole of said projecting body and said hand screw hole of said connecting body for affixing said connecting body to said clamp holder.

2. The lamp structure with a replaceable mounting base according to claim 1 wherein said replaceable mounting base is a ground spike.

* * * * *